(12) United States Patent
Campbell et al.

(10) Patent No.: US 10,459,419 B2
(45) Date of Patent: Oct. 29, 2019

(54) WEB JAM DETECTOR

(71) Applicants: Brian D Campbell, Sterling Heights, MI (US); Jesse C James, White Lake, MI (US); Bruce M Berriman, Sterling Heights, MI (US)

(72) Inventors: Brian D Campbell, Sterling Heights, MI (US); Jesse C James, White Lake, MI (US); Bruce M Berriman, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 88 days.

(21) Appl. No.: 15/889,954

(22) Filed: Feb. 6, 2018

(65) Prior Publication Data

US 2019/0243328 A1  Aug. 8, 2019

(51) Int. Cl.
*G05B 19/05* (2006.01)
*B02C 25/00* (2006.01)
*B02C 18/00* (2006.01)
*B02C 19/00* (2006.01)

(52) U.S. Cl.
CPC ........ *G05B 19/058* (2013.01); *B02C 18/0084* (2013.01); *B02C 19/0062* (2013.01); *B02C 25/00* (2013.01); *G05B 2219/14006* (2013.01); *G05B 2219/14045* (2013.01)

(58) Field of Classification Search
CPC ........ G05B 19/058; G05B 2219/14045; G05B 2219/14006; B02C 18/0084; B02C 19/0062; B02C 25/00

USPC .......................................... 700/108, 122–129
See application file for complete search history.

(56) References Cited

U.S. PATENT DOCUMENTS

| | | | |
|---|---|---|---|
| 3,878,745 A | 4/1975 | Handziak et al. | |
| 3,979,980 A | 9/1976 | Biester et al. | |
| 4,483,124 A | 11/1984 | Ohba et al. | |
| 2006/0115313 A1* | 6/2006 | Shaw, III | ................. B41J 11/42 400/621 |
| 2015/0273479 A1* | 10/2015 | Dillard, Jr. | .............. B02C 25/00 241/30 |

* cited by examiner

*Primary Examiner* — Robert E Fennema
*Assistant Examiner* — Jigneshkumar C Patel
(74) *Attorney, Agent, or Firm* — Ralph E Smith (57) ABSTRACT

A web jam detector and associated method are provided for detecting a jam of feedstock material in a scrap chopper. A web detection bar, mounted to the scrap chopper, includes a plurality of web detection fingers. The plurality of web detection fingers are made of an electrically conductive material, are electrically connected to and extend outwardly from the web detection bar, and are positioned to contact the feedstock material when the scrap chopper is in a closed position. A web jam detection circuit is electrically connected to the web detection bar. In operation, the web jam detection circuit supplies direct current electricity to the web detection bar and generates feedback signals based on a voltage of the web detection bar. The feedback signals are indicative of the presence or absence of the feedstock material at the plurality of web detection fingers.

15 Claims, 5 Drawing Sheets

WEB JAM DETECTOR

FIELD

The subject disclosure generally relates to sheet metal stamping equipment and manufacturing processes. More particularly, a system and related methods for detecting a jam of feedstock material in a scrap chopper is disclosed.

BACKGROUND

This section provides background information related to the present disclosure which is not necessarily prior art.

Sheet metal stamping operations are used throughout many industries to manufacture parts. In the automotive industry, stamping presses are used to manufacture body panels and other vehicle parts. Feedstock material, such as sheet metal, is fed through the stamping press along a feed direction. As the stamping press closes on the sheet metal, a part is formed in the sheet metal in the shape of the mold that is installed in the stamping press. Such operations typically produce a web of scrap feedstock material that exits the stamping press along the feed direction. This web of scrap feedstock material may be fed into a scrap chopper for further processing. The web of scrap feedstock material is formed of the excess material that surrounds the stamped part. Typically, the web of scrap feedstock material is continuous and is shaped like a web, mesh, or ribbons. The scrap chopper has a chopper blade that moves up and down to chop or cut the web of scrap feedstock material into smaller pieces of scrap material. The smaller pieces of scrap material exit the chopper and travel down a scrap shoot. The scrap material is then discarded or recycled. In the automotive industry, such stamping operations may be performed continuously, 24 hours a day, 7 days a week.

One problem that can occur during stamping operations is that the web of scrap feedstock material can jam inside the scrap chopper. When this happens, the web of scrap feedstock material is not cut by the chopper blade and accumulates inside the scrap chopper. Expensive damage to the scrap chopper and/or the stamping press can result if the problem persists and the manufacturing line is not shut down in time. Even when no equipment damage results, the down time required to clear the jam results in production loss, which can be costly. Typically, scrap feedstock material will continue to accumulate in the scrap chopper after a jam starts to occur until the manufacturing line is shut down. As a result, the amount of time required to clear a jam and the probability of equipment damage increases the longer the manufacturing line remains running after a jam starts to occur.

SUMMARY

This section provides a general summary of the disclosure, and is not a comprehensive disclosure of its full scope or all of its features.

In accordance with one aspect of the subject disclosure, a web jam detector for detecting a jam of feedstock material in a scrap chopper is described. The web jam detector includes a web detection bar, adapted to be mounted to the scrap chopper, that includes a plurality of web detection fingers. The plurality of web detection fingers are made of an electrically conductive material. The plurality of web detection fingers are electrically connected to and extend outwardly from the web detection bar and are positioned to contact the feedstock material when the scrap chopper is in a closed position. The web jam detector also includes a web jam detection circuit that is electrically connected to the web detection bar. In operation, the web jam detection circuit supplies direct current electricity to the web detection bar and generates feedback signals based upon a voltage of the web detection bar. The feedback signals are indicative of the presence or absence of the feedstock material at the plurality of web detection fingers.

In accordance with another aspect of the subject disclosure, a method of detecting a jam of feedstock material in a scrap chopper using the web jam detector described above is disclosed. The method comprises the steps of: determining a duration of one chopper cycle by monitoring the position of the scrap chopper, supplying direct current electricity to the plurality of web detection fingers, and monitoring the voltage of the web detection fingers over one chopper cycle. The method also includes the step of determining if a jam of the feedstock material in the scrap chopper exists based on the voltage of the web detection fingers, which is monitored over one chopper cycle. The method also provides for returning to the step of supplying direct current electricity to the plurality of web detection fingers for processing a subsequent chopper cycle if no jam exists and shutting down the scrap chopper if a jam does exist.

In accordance with the subject disclosure, jams in the scrap chopper are detected autonomously by the web detection bar and associated web jam detection circuit. Advantageously, this results in faster jam detection, which in turn reduces equipment down time and reduces the risk of equipment damage.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Referring to the Figures, wherein like numerals indicate corresponding parts throughout the several views, a web jam detector 20 for detecting jam of feedstock material 22 in a scrap chopper 24 is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to, the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
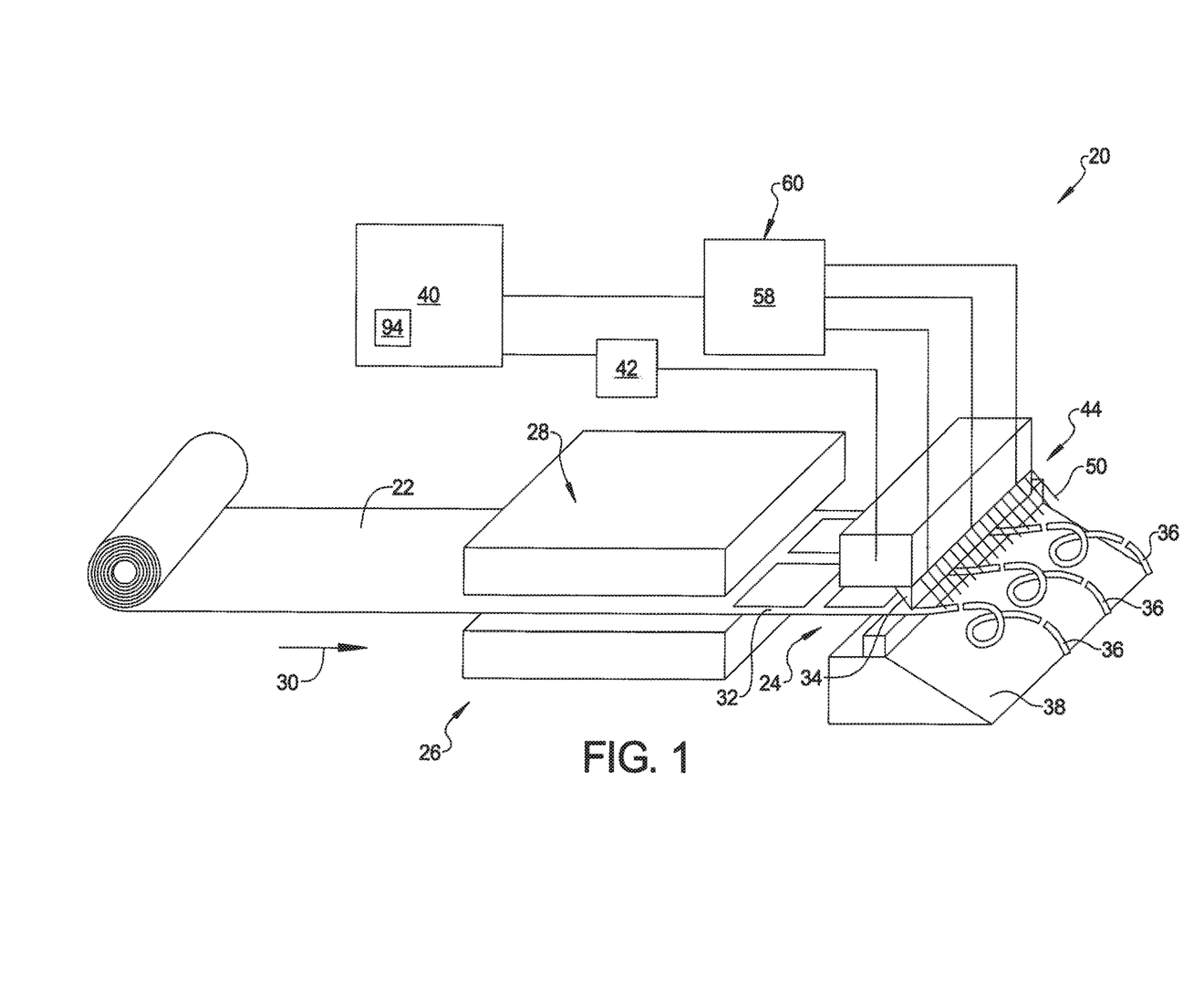
FIG. 1 is a perspective view and schematic diagram of an exemplary manufacturing line equipped with an exemplary web jam detector that is constructed in accordance with the teachings of the subject disclosure.

With reference to FIG. 1, a manufacturing line 26 for stamping the feedstock material 22 is illustrated. The manufacturing line 26 includes a stamping press 28 that opens and closes on the feedstock material 22 as the feedstock material 22 is fed through the stamping press 28 along feed direction 30. Although the feedstock material 22 is depicted as a roll of sheet metal in FIG. 1, it should be appreciated that the feedstock material 22 may be any electrically conductive material. Parts are stamped out of the feedstock material 22 in the stamping press 28. A web 32 of scrap feedstock material 22 exits the stamping press 28 along the feed direction 30 and is fed into the scrap chopper 24. The web 32 of scrap feedstock material 22 is formed of the excess material that surrounds the stamped part. Typically, the web 32 of scrap feedstock material 22 is continuous and is shaped like a web, mesh, or ribbons. The scrap chopper 24 has a chopper blade 34 that moves up in a chopper opening stroke and down in a chopper closing stroke to chop or cut the web 32 of scrap feedstock material 22 into smaller pieces 36 of scrap feedstock material 22. The smaller pieces 36 of scrap feedstock material 22 exit the chopper and travel down a scrap shoot 38. The smaller pieces 36 of scrap feedstock material 22 are then discarded or recycled. It should be appreciated that the subject disclosure is applicable to a wide variety of different scrap choppers. By way of non-limiting example, the scrap chopper 24 shown in the illustrated embodiment is made by Automatic Feed Company of Napoleon, Ohio.

A programmable logic controller 40 (PLC) controls the operation of the scrap chopper 24. The programmable logic controller 40 includes at least one processor and memory and is electrically connected to the scrap chopper 24. Although a wide variety of programmable logic controllers may be used, by way of example and without limitation, the programmable logic controller 40 may be an Allen-Bradley PLC input card made by Rockwell Automation of Milwaukee, Wis. The memory of the programmable logic controller 40 is programmed to control operation of the scrap chopper 24. The scrap chopper 24 includes a rotary encoder 42 that is positioned to monitor the location/position (i.e., height) of the chopper blade 34 relative to the web 32 of scrap feedstock material 22. The rotary encoder 42 measures the position of the chopper blade 34 through a 360 degree rotation where zero and 360 degrees corresponds to the scrap chopper 24 being completely open (i.e., the chopper blade 34 being all the way up) and 180 degrees corresponds to the scrap chopper 24 being completely closed (i.e., the chopper blade 34 being all the way down). The rotary encoder 42 is electrically connected to the programmable logic controller 40 and sends a signal to the programmable logic controller 40 with position measurements of the chopper blade 34. As a result, the programmable logic controller 40 is capable of determining when the scrap chopper 24 is in a closed position and when the scrap chopper 24 is in an open position. The programmable logic controller 40 is also capable of determining the duration of one complete chopper cycle, which consists of the chopper blade 34 traveling down from the open position (zero degrees) to the closed position (180 degrees) during the chopper closing stroke and back up from the closed position (180 degrees) to the open position (360 degrees) during the chopper opening stroke. The cycle speed of the scrap chopper 24 may vary depending on various parameters of the manufacturing line 26. By way of example and without limitation, the cycle speed may be approximately 60 cycles per minute.

One problem with the system described above is that the web 32 of scrap feedstock material 22 can jam inside the scrap chopper 24. When this happens, the web 32 of scrap feedstock material 22 is not cut by the chopper blade 34 and accumulates inside the scrap chopper 24. Expensive damage to the scrap chopper 24 and/or the stamping press 28 can result if the problem persists and the manufacturing line 26 is not shut down in time. Even when no equipment damage results, the down time required to clear a jam results in production loss, which can be costly. Typically, scrap feedstock material 22 will continue to accumulate in the scrap chopper 24 after a jam starts to occur until the manufacturing line 26 is shut down. As a result, the amount of time required to clear a jam and the probability of equipment damage increases the longer the manufacturing line 26 remains running after a jam starts to occur. It is therefore desirable to shut down the manufacturing line 26 shortly after a jam in the scrap chopper 24 starts to occur. In accordance with the subject disclosure, jams in the scrap chopper 24 are detected autonomously using a web detection bar 44 that is mounted to the scrap chopper 24.

Figure 2:
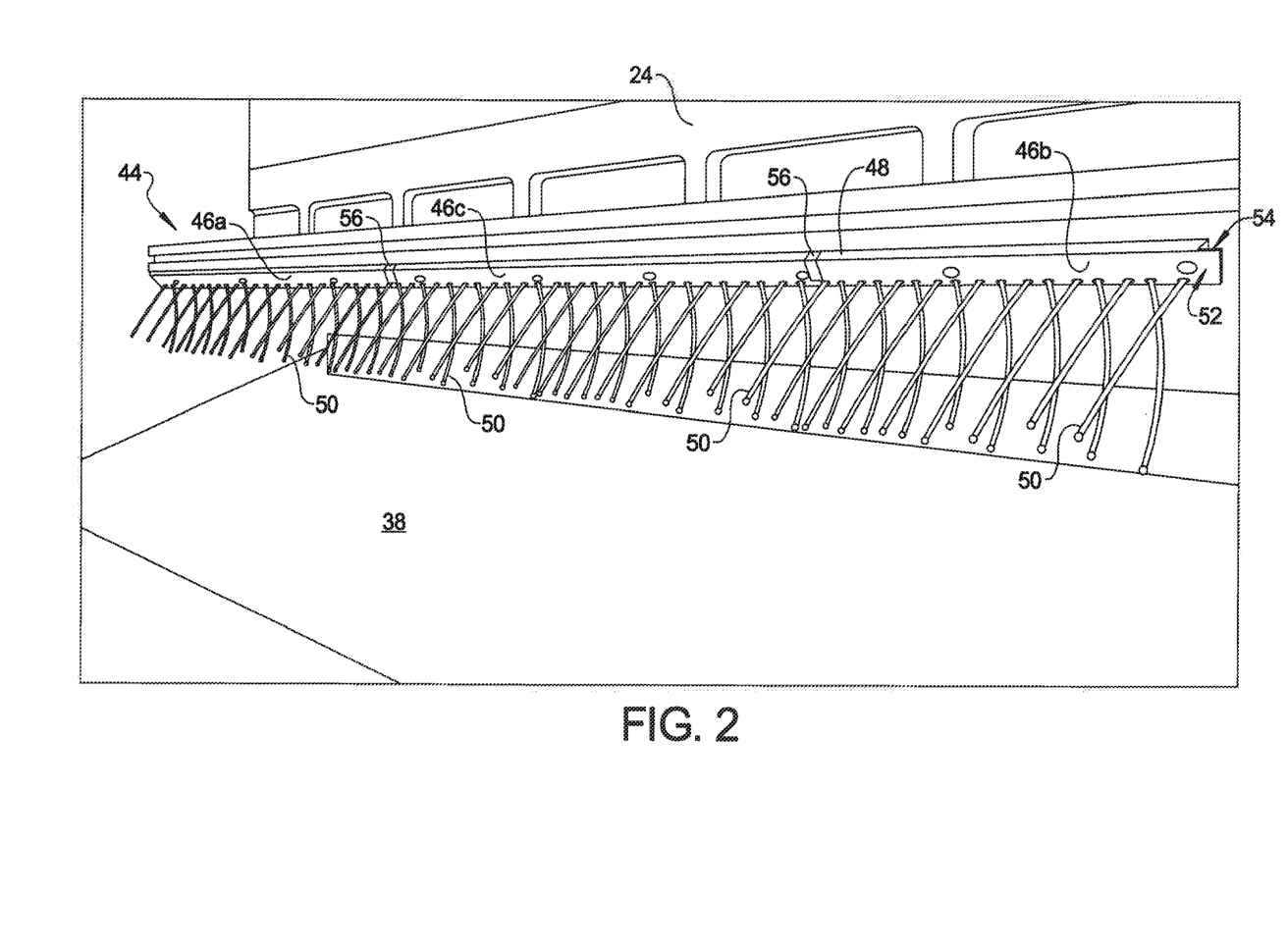
FIG. 2 is a front perspective view of a web detection bar of the exemplary web jam detector illustrated in FIG. 1.

With additional reference to FIG. 2, the web detection bar 44 includes one or more bus bars 46*a*, 46*b*, 46*c*, an insulator 48, and a plurality of web detection fingers 50. The bus bars 46*a*, 46*b*, 46*c* of the web detection bar 44 are mounted to the scrap chopper 24 adjacent the chopper blade 34. Accordingly, the web detection bar 44 moves up and down with the chopper blade 34 between the open position and the closed position. Each bus bar 46*a*, 46*b*, 46*c* includes a front face 52 and a rear face 54 that is opposite the front face 52. The insulator 48 is positioned between the rear face 54 of the bus bars 46*a*, 46*b*, 46*c* and the scrap chopper 24. The insulator 48 is made of a non-conductive material and therefore does not conduct electricity. As a result, the insulator 48 electrically isolates the bus bars 46*a*, 46*b*, 46*c* from the scrap chopper 24. Although other materials can be used, in the illustrated example, the insulator 48 is made of a plastic nylon material. The plurality of web detection fingers 50 are electrically connected to and extend outwardly from the front face 52 of the bus bars 46*a*, 46*b*, 46*c*. The bus bars 46*a*, 46*b*, 46*c* and the plurality of web detection fingers 50 may be made of the same material or different materials; however, the bus bars 46*a*, 46*b*, 46*c* and the plurality of web detection fingers 50 are both made of electrically conductive materials. By way of example and without limitation, the bus bars 46*a*, 46*b*, 46*c* may be made of aluminum and each of the plurality of web detection fingers 50 may be made of an electrically conductive cable, such as galvanized steel cable.

The plurality of web detection fingers 50 are positioned to contact the web 32 of scrap feedstock material 22 when the scrap chopper 24 is in the closed position. Each of the plurality of web detection fingers 50 extends from the front face 52 of the bus bars 46*a*, 46*b*, 46*c* at an angle relative to the feed direction 30 of the feedstock material 22. However, the plurality of web detection fingers 50 are arranged such that they do not contact the scrap chopper 24 or the scrap shoot 38 when the chopper blade 34 is in the closed position. In the illustrated embodiment, the web detection bar 44 includes a first side bus bar 46*a*, a second side bus bar 46*b*, and a center bus bar 46*c*. The center bus bar 46*c* is positioned axially between the first and second side bus bars 46*a*, 46*b* and is spaced from the first and second side bus bars 46*a*, 46*b* by insulated breaks 56. The insulated breaks 56 may be integral with or separate from the insulator 48 and therefore may be made of the same material as the insulator 48 or a different non-conductive material. The three isolated bus bars 46*a*, 46*b*, 46*c* allow the web detection bar 44 to be configured to detect the web 32 of scrap feedstock material 22 exiting the scrap chopper 24 at different transverse positions. This gives the web detection bar 44 greater flexibility because the width and feed position (i.e., transverse position) of the web 32 of scrap feedstock material 22 can vary depending on the size and shape of the stamped parts, the size and shape of the feedstock material 22, and the position of the stamped parts relative to the feedstock material 22. However, it should be appreciated that the web detection bar 44 may alternatively have a single bus bar or a different number of bus bars than the three bus bars 46*a*, 46*b*, 46*c* shown in the illustrated embodiment.

Figure 3:
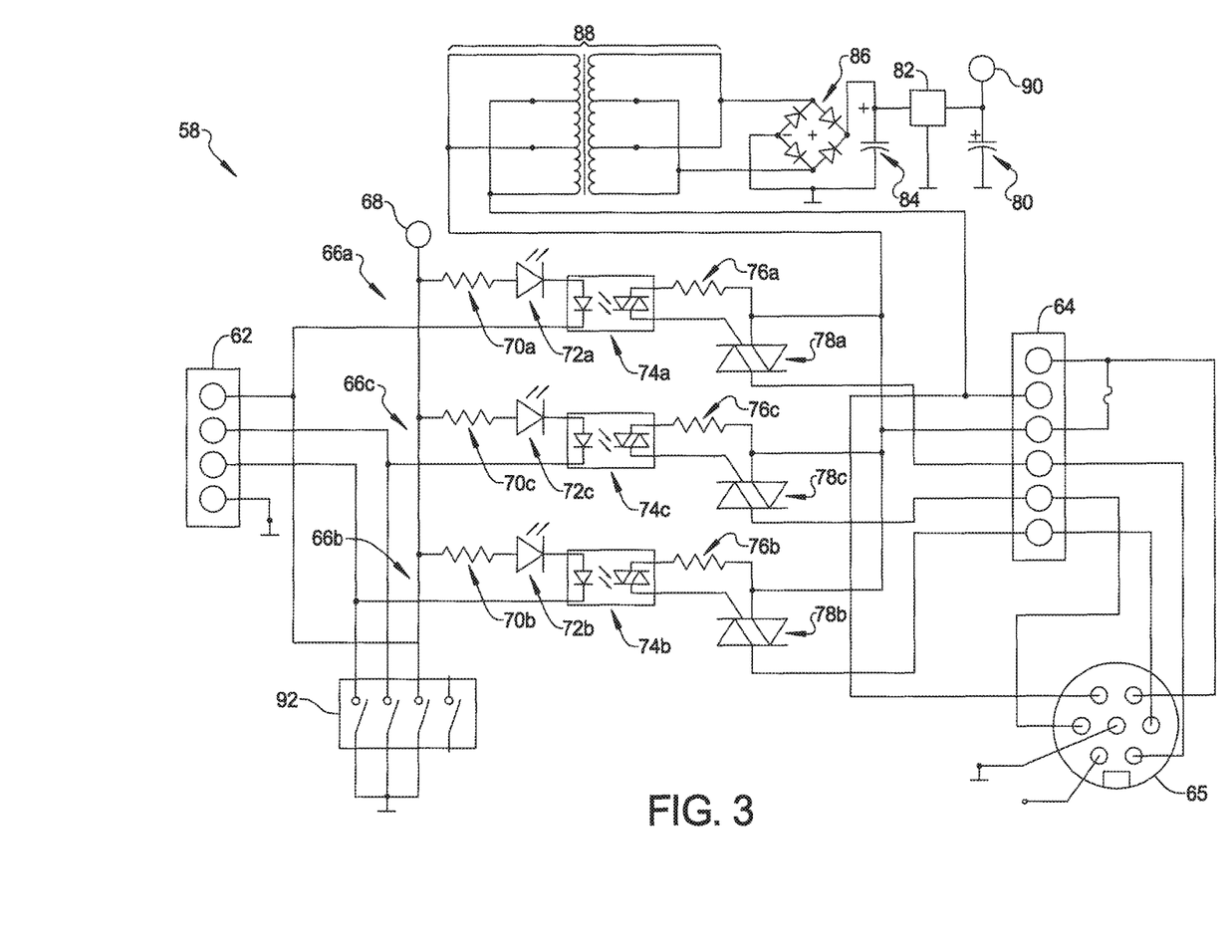
FIG. 3 is a circuit diagram of a web jam detection circuit of the exemplary web jam detector illustrated in FIG. 1.

With additional reference to FIG. 3, the web jam detector 20 includes a web jam detection circuit 58. Although other configurations are possible, the web jam detection circuit 58 may be configured as an integrated circuit (IC) on a printed circuit board that is housed inside a cabinet 60 adjacent to or mounted on the scrap chopper 24. The web jam detection circuit 58 has at least one input terminal 62 and at least one output terminal 64. The input terminal 62 is electrically connected to the one or more bus bars 46*a*, 46*b*, 46*c* of the web detection bar 44. The output terminal 64 is electrically connected to the programmable logic controller 40 by a plug 65. In operation, the web jam detection circuit 58 supplies direct current (DC) electricity to the bus bars 46*a*, 46*b*, 46*c*. The web jam detection circuit 58 is also configured to generate one or more feedback signals based upon a voltage of the bus bars 46*a*, 46*b*, 46*c* and transmit the feedback signals to the programmable logic controller 40.

The web jam detection circuit 58 has a signal processing branch 66*a*, 66*b*, 66*c* for each bus bar 46*a*, 46*b*, 46*c*. In the illustrated embodiment, the web jam detection circuit 58 includes a first signal processing branch 66*a*, a second signal processing branch 66*b*, and a third signal processing branch 66*c* that are arranged in parallel with one another between the input and output terminals 62, 64. The first signal processing branch 66*a* is electrically connected to the first side bus bar 46*a* and the programmable logic controller 40. In operation, the first signal processing branch 66*a* receives a first voltage from the first side bus bar 46*a* and outputs a first feedback signal to the programmable logic controller 40. The second signal processing branch 66*b* is electrically connected to the second side bus bar 46*b* and the programmable logic controller 40. In operation, the second signal processing branch 66*b* receives a second voltage from the second bus side bar 46*b* and outputs a second feedback signal to the programmable logic controller 40. The third signal processing branch 66*c* is electrically connected to the center bus bar 46*c* and the programmable logic controller 40. In operation, the third signal processing branch 66*c* receives a third voltage from the center bus bar 46*c* and outputs a third feedback signal to the programmable logic controller 40. The sampling rate of the web jam detection circuit 58 may vary depending on the parameters of the manufacturing line 26. By way of example and without limitation, the sampling rate of the web jam detection circuit 58 may be approximately 35 milliseconds (ms).

A first direct current power source 68 is electrically connected to each of the first, second, and third signal processing branches 66*a*, 66*b*, 66*c*. The web jam detection circuit 58 supplies the direct current electricity from the first direct current power source 68 to the bus bars 46*a*, 46*b*, 46*c* and therefore the plurality of web detection fingers 50. A low voltage is preferred for safety reasons in the event a manufacturing line worker accidentally touches one of the bus bars 46*a*, 46*b*, 46*c* or the plurality of web detection fingers 50. By way of example and without limitation, the first direct current power source 68 may supply direct current electricity with a voltage of approximate 5 volts (V) to the web detection bar 44. The web 32 of scrap feedstock material 22 is grounded by the stamping press 28, the scrap chopper 24, and/or the scrap shoot 38. Accordingly, the web 32 of scrap feedstock material 22 pulls the voltage of the web detection bar 44 down when the plurality of web detection fingers 50 contact the web 32 of scrap feedstock material 22. However, changes in the voltage of the direct current electricity flowing through the web detection bar 44 cannot be read and processed by the programmable logic controller 40. The first, second, and third signal processing branches 66a, 66b, 66c convert the feedback signals the web jam detection circuit 58 receives from the web detection bar 44 to an output signal that the programmable logic controller 40 can read.

Each of the first, second, and third signal processing branches 66a, 66b, 66c includes a first resistor 70a, 70b, 70c, a light emitting diode 72a, 72b, 72c (LED), a first optically isolated bidirectional triode thyristor 74a, 74b, 74c (TRIAC), a second resistor 76a, 76b, 76c, and a second bidirectional triode thyristor 78a, 78b, 78c (TRIAC) that are electrically connected to and arranged in series between the input and output terminals 62, 64 of the web jam detection circuit 58. The first and second resistors 70a, 70b, 70c, and 76a, 76b, 76c decrease current flow through the first, second, and third signal processing branches 66a, 66b, 66c. The light emitting diode 72a, 72b, 72c provides a visual indication that the first, second, and third signal processing branches 66a, 66b, 66c have power and are working. The first optically isolated bidirectional triode thyristor 74a, 74b, 74c includes a photo-resistor that converts the low voltage direct current feedback signals that the web jam detection circuit 58 receives from the web detection bar 44 to a low current 120 volt (V) alternating current (AC) signal. The current of this signal is then increased (i.e., stepped-up) by the second bidirectional triode thyristor 78a, 78b, 78c. The high current 120 volt (V) alternating current (AC) signal is then transmitted to the programmable logic controller 40 for processing. Advantageously, the high current 120 volt (V) alternating current (AC) signal can be transmitted over large distances without significant signal degradation so the programmable logic controller 40 does not have to be located close to the scrap chopper 24.

The web jam detection circuit 58 further includes a first capacitor 80, a voltage regulator 82, a second capacitor 84, a bridge rectifier 86, and a step-down transformer 88 that are electrically connected to and arranged in series between a second direct current power source 90 and the first, second, and third signal processing branches 66a, 66b, 66c to power the second bidirectional triode thyristor 78a, 78b, 78c of the first, second, and third signal processing branches 66a, 66b, 66c. The electricity supplied by the second direct current power source 90 may also have a low voltage. By way of example and without limitation, the second direct current power source 90 may supply direct current electricity with a voltage of approximate 5 volts (V). The first and second capacitors 80, 84 regulate the current of the electricity flowing to the bridge rectifier 86 and the voltage regulator 82 regulates the voltage of the electricity flowing to the bridge rectifier 86 to prevent current and voltage spikes. The bridge rectifier 86 converts the direct current electricity supplied by the second direct current power source 90 to alternating current (AC) electricity. The step-down transformer 88 then reduces the voltage of the alternating current electricity flowing from the bridge rectifier 86 before it is transmitted to the second bidirectional triode thyristor 78a, 78b, 78c of the first, second, and third signal processing branches 66a, 66b, 66c.

Optionally, the web jam detection circuit 58 may include a dual in-line package (DIP) switch 92 that is electrically connected to the first, second, and third signal processing branches 66a, 66b, 66c. The dual in-line package switch 92 can be used as a manual override to selectively bypass one or more of the first, second, and third signal processing branches 66a, 66b, 66c in case of a malfunction or a stamping process where the web 32 of scrap feedstock material 22 does not feed under all of the bus bars 46a, 46b, 46c. Alternatively, the functionality of the dual in-line package switch 92 can be replicated in the software of the programmable logic controller 40, eliminating the need for the hard-wired dual in-line package switch 92 shown in FIG. 3.

As will be explained in greater detail below, the memory of the programmable logic controller 40 is configured to store the feedback signals received from the web jam detection circuit 58 as software bits. The programmable logic controller 40 may also include an accumulator 94 that increments an accumulator value when the processor throws a fault based on comparing the software bits to a pre-programmed bit pattern that is stored in the memory of the programmable logic controller 40. The pre-programmed bit pattern essentially maps out what the feedback signals should look like for a perfect chopper cycle where no jam exists. As will be explained in greater detail below, software stored in the memory of the programmable logic controller 40 identifies potential jams when the software bits temporarily saved in the memory for one chopper cycle deviate from the pre-programmed bit pattern.

Figure 4:
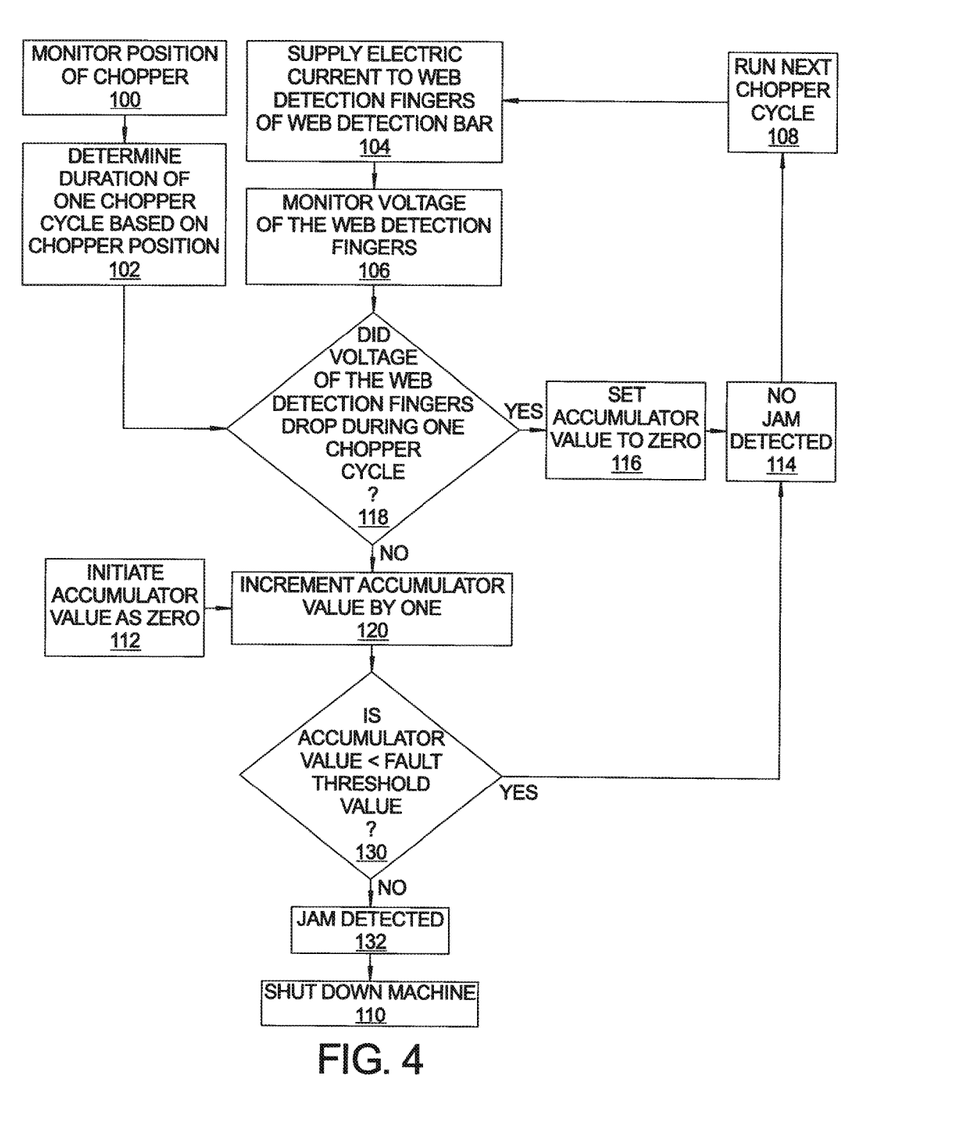
FIG. 4 is a flow diagram showing the steps of an exemplary method for detecting a jam of feedstock material in a scrap chopper.
Figure 5:
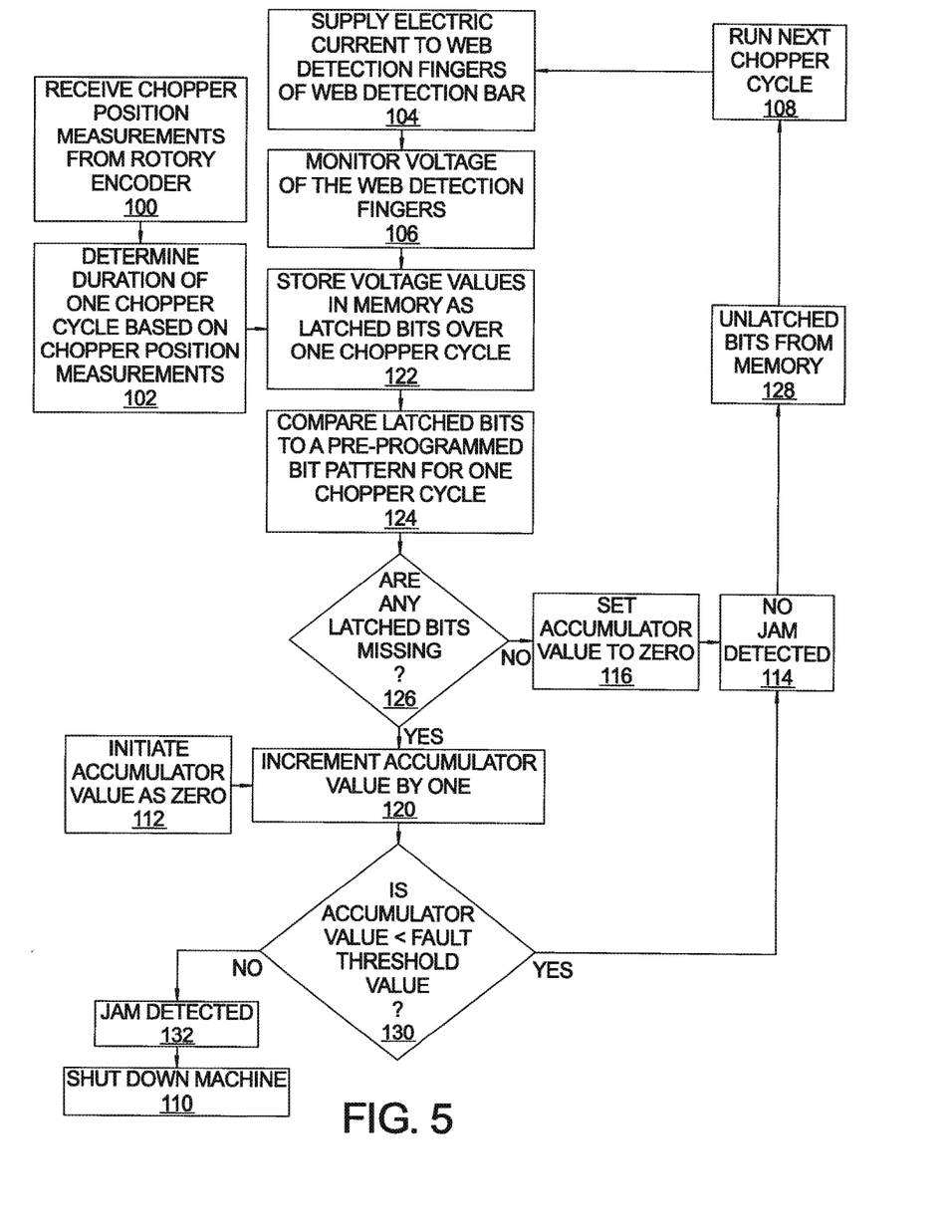
FIG. 5 is another flow diagram showing the steps of another exemplary method for detecting a jam of feedstock material in a scrap chopper.

With reference to FIGS. 4 and 5, methods of detecting a jam of the feedstock material 22 in the scrap chopper 24 described above are illustrated. The methods include step 100 of monitoring position of the scrap chopper 24 and step 102 of determining a duration of one chopper cycle based on step 100. In accordance with the illustrated example, step 102 is performed by the programmable logic controller 40 based on position measurements of the rotary encoder 42. The methods also include step 104 of supplying direct current electricity to the plurality of web detection fingers 50 and step 106 of monitoring the voltage of the web detection fingers 50. In accordance with the illustrated example, steps 104 and 106 are performed by the web jam detection circuit 58. The methods further include determining if a jam of the feedstock material 22 in the scrap chopper 24 exists based on the voltage of the web detection fingers 50. The methods further comprise step 108 of returning to the step of supplying direct current to the plurality of web detection fingers 50 for processing a subsequent chopper cycle if no jam exists and step 110 of shutting down the scrap chopper 24 if a jam does exist. In accordance with the illustrated example, steps 108 and 110 are also performed by the programmable logic controller 40.

FIGS. 4 and 5 illustrate two exemplary ways of determining if a jam of the feedstock material 22 in the scrap chopper 24 exists. Both methods include step 112 of initiating an accumulator 94 value as zero and storing the accumulator 94 value in the memory of the programmable logic controller 40. Step 112 only occurs at the beginning of the first chopper cycle and is not repeated before subsequent chopper cycles.

The method illustrated in FIG. 4 further includes step 114 of detecting that no jam exists and step 116 of setting the accumulator 94 value to zero if the voltage of the web detection fingers 50 dropped during one chopper cycle, as determined by step 118. Accordingly, the accumulator 94 is effectively reset whenever the programmable logic controller 40 determines that no jam exists. The method illustrated in FIG. 4 also includes step 120 of incrementing the accumulator 94 value by one if the voltage of the web detection fingers 50 did not drop during one chopper cycle and storing the accumulator 94 value in the memory of the programmable logic controller 40. In accordance with the illustrated example, steps 114-120 are performed by the programmable logic controller 40.

The method illustrated in FIG. 5 further includes step 122 of storing voltage values in the memory of the programmable logic controller 40 as latched bits over one chopper cycle. The method includes step 124 of comparing latched bits to a pre-programmed bit pattern for one chopper cycle to determine if any latched bits are missing, as described by step 126. As explained above, the pre-programmed bit pattern maps out what the latched bits should look like for a perfect chopper cycle where no jam exists. The method illustrated in FIG. 5 also includes step 114 of determining that no jam exists and step 116 of setting the accumulator 94 valve to zero if no latched bits are missing and step 120 of incrementing the accumulator 94 value by one if latched bits are missing and storing the accumulator 94 value in memory. If no jam is detected, the method progresses to step 128 of unlatching (i.e., clearing) the bits from memory. In accordance with the illustrated example, steps 122-128 are performed by the programmable logic controller 40.

Both of the methods illustrated in FIGS. 4 and 5 progress to step 114 of determining that no jam exists if the accumulator 94 value is less than a fault threshold value, as determined by step 130. In accordance with step 130, the method proceeds to step 132 of determining that a jam of the feedstock material 22 in the scrap chopper 24 exists if the accumulator 94 value is not less than the fault threshold value (i.e., if the accumulator 94 valve is greater than or equal to the fault threshold value). In accordance with the illustrated example, steps 130 and 132 are performed by the programmable logic controller 40. The fault threshold value may be any integer greater than or equal to one. By way of example and without limitation, the fault threshold value may be three. In this example, the programmable logic controller 40 has to detect three consecutive faults before determining that a jam exists and consequently shutting down the scrap chopper 24. This helps reduce the chance of the programmable logic controller 40 shutting down the scrap chopper 24 due to false readings.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the apparatus claims.

What is claimed is:

1. A web jam detector for detecting jam of feedstock material in a scrap chopper comprising:
    a web detection bar, adapted to be mounted to the scrap chopper, that includes a plurality of web detection fingers made of an electrically conductive material;
    said plurality of web detection fingers electrically connected to and extending outwardly from said web detection bar and positioned to contact the feedstock material when the scrap chopper is in a closed position; and
    a web jam detection circuit electrically connected to said web detection bar that is adapted to supply direct current to said web detection bar and generate feedback signals based upon a voltage of said web detection bar that are indicative of the presence or absence of the feedstock material at said plurality of web detection fingers.

2. The web jam detector of claim 1, further comprising:
    a programmable logic controller, programmed to control operation of the scrap chopper, that is electrically connected to the scrap chopper and said web jam detection circuit.

3. The web jam detector of claim 2, wherein said web detection bar includes an insulator, a first side bus bar, a second side bus bar, and a center bus bar positioned axially between said first and second side bus bars, said first side bus bar, said second side bus bar, and said center bus bar being made of an electrically conductive material, said insulator being positioned between the scrap chopper and said first side bus bar, said second side bus bar, and said center bus bar, said center bus bar being spaced from said first and second side bus bars by insulated breaks, and said plurality of web detection fingers being electrically connected to and extending outwardly from said first side bus bar, said second side bus bar, and said center bus bar.

4. The web jam detector of claim 2, wherein said programmable logic controller includes memory that is configured to store said feedback signals received from said web jam detection circuit as software bits.

5. The web jam detector of claim 4, wherein said programmable logic controller includes a processor and an accumulator that increments an accumulator value when said processor throws a fault based on comparing said software bits to a pre-programmed bit pattern stored in said memory.

6. The web jam detector of claim 3, wherein said web jam detection circuit has a first signal processing branch, a second signal processing branch, and a third signal processing branch that are arranged in parallel, said first signal processing branch electrically connected to said first bus bar and said programmable logic controller and adapted to receive a first voltage from said first bus bar and output a first feedback signal to said programmable logic controller, said second signal processing branch electrically connected to said second bus bar and said programmable logic controller and adapted to receive a second voltage from said second bus bar and output a second feedback signal to said programmable logic controller, and said third signal processing branch electrically connected to said center bus bar and said programmable logic controller and adapted to receive a third voltage from said center bus bar and output a third feedback signal to said programmable logic controller.

7. The web jam detector of claim 1, wherein said web jam detection circuit includes at least one signal processing branch having at least one bidirectional triode thyristor that is electrically connected to said web detection bar and a first direct current power source that is electrically connected to said at least one signal processing branch.

8. The web jam detector of claim 7, wherein said first direct current power source supplies electricity to said at least one signal processing branch at a voltage of less than 10 volts.

9. The web jam detector of claim 7, wherein said web jam detection circuit includes at least one capacitor, a voltage regulator, a bridge rectifier, and a step-down transformer that are electrically connected to and arranged between a second direct current power source and said at least one signal processing branch.

10. The web jam detector of claim 1, wherein each of said plurality of web detection fingers is made of an electrically conductive cable that extends from said web detection bar at an angle relative to a feed direction of the feedstock material.

11. A method of detecting a jam of feedstock material in a scrap chopper, the method comprising the steps of:
   determining a duration of one chopper cycle by monitoring position of the scrap chopper;
   supplying direct current to a plurality of web detection fingers on a web detection bar;
   monitoring voltage of the web detection fingers over one chopper cycle;
   determining if a jam of the feedstock material in the scrap chopper exists based on the voltage of the web detection fingers monitored over one chopper cycle;
   returning to said step of supplying direct current to the plurality of web detection fingers on the web detection bar for processing a subsequent chopper cycle if no jam exists; and
   shutting down the scrap chopper if a jam exists.

12. The method as set forth in claim 11, wherein the step of determining if a jam of the feedstock material in the scrap chopper exists comprises the steps of:
   determining that no jam of the feedstock material in the scrap chopper exists and setting an accumulator value to zero if the voltage of the web detection fingers dropped during one chopper cycle;
   incrementing the accumulator value by one if the voltage of the web detection fingers did not drop during one chopper cycle and storing the accumulator value in memory;
   determining that no jam of the feedstock material in the scrap chopper exists if the accumulator value is less than a fault threshold value; and
   determining that a jam of the feedstock material in the scrap chopper exists if the accumulator value is not less than the fault threshold value.

13. The method as set forth in claim 12, wherein the fault threshold value is an integer less than 5.

14. The method as set forth in claim 11, wherein the step of determining if a jam of the feedstock material in the scrap chopper exists comprises the steps of:
   storing voltage values in memory as latched bits over one chopper cycle;
   comparing latched bits to a pre-programmed bit pattern for one chopper cycle to determine if any latched bits are missing;
   determining that no jam of the feedstock material in the scrap chopper exists and setting an accumulator valve to zero if no latched bits are missing;
   incrementing the accumulator value by one if latched bits are missing and storing the accumulator value in memory;
   determining that no jam of the feedstock material in the scrap chopper exists if the accumulator value is less than a fault threshold value; and
   determining that a jam of the feedstock material in the scrap chopper exists if the accumulator value is not less than the fault threshold value.

15. The method as set forth in claim 14, wherein the fault threshold value is an integer less than 5.

* * * * *